(12) United States Patent
Wegenast

(10) Patent No.: US 12,193,376 B2
(45) Date of Patent: Jan. 14, 2025

(54) GREENABLE WALL ELEMENT

(71) Applicant: Klaus Wegenast, Freiburg (DE)

(72) Inventor: Klaus Wegenast, Freiburg (DE)

( * ) Notice: Subject to any disclaimer, the term of this patent is extended or adjusted under 35 U.S.C. 154(b) by 0 days.

(21) Appl. No.: 18/020,469

(22) PCT Filed: Aug. 4, 2021

(86) PCT No.: PCT/EP2021/071758
§ 371 (c)(1),
(2) Date: Feb. 9, 2023

(87) PCT Pub. No.: WO2022/033935
PCT Pub. Date: Feb. 17, 2022

(65) Prior Publication Data
US 2023/0263104 A1    Aug. 24, 2023

(30) Foreign Application Priority Data
Aug. 10, 2020 (DE) .......................... 102020121022.1

(51) Int. Cl.
*A01G 9/02* (2018.01)
*E04B 1/80* (2006.01)

(52) U.S. Cl.
CPC ................ *A01G 9/025* (2013.01); *E04B 1/80* (2013.01)

(58) Field of Classification Search
CPC .......... A01G 9/025; A01G 9/02; A01G 20/00; A01G 31/00
See application file for complete search history.

(56) References Cited

U.S. PATENT DOCUMENTS

| | | | |
|---|---|---|---|
| 10,485,185 B1* | 11/2019 | Di Prima-Bucci | .... A01G 9/025 |
| 2002/0104264 A1* | 8/2002 | Chick | .... A01G 9/025 52/173.1 |
| 2008/0209805 A1* | 9/2008 | Daures | .... A01G 9/025 47/66.7 |

(Continued)

FOREIGN PATENT DOCUMENTS

| | | |
|---|---|---|
| AU | 2010236051 | 5/2011 |
| CH | 682090 | 7/1993 |

(Continued)

OTHER PUBLICATIONS

Sprich. "Lamellenrost", pp. 1-6, Retrieved from the Internet: https://www.sprich.ch/assets/documents/Datenblaetter/Gitterroste/Lamellemost_Wasserzeichen.pdf, Jun. 1, 2017 (Jun. 1, 2017), [retrieved on Nov. 17, 2021].

*Primary Examiner* — Kristen C Hayes
(74) *Attorney, Agent, or Firm* — Volpe Koenig

(57) ABSTRACT

A greenable wall element with at least one wall component oriented in the vertical direction or in the diagonal direction. The wall component delimits a cavity of the wall element is fillable with planting substrate, and has a multiplicity of plant openings through which plants rooting in the plant substrate can grow onto the side of the wall element directed away from the plant substrate. The at least one wall component has, at least in a subregion, a slatted grating formed from crossing groups of bars, of which a first group of spaced-apart parallel bars is oriented in the vertical or diagonal direction and of which a second group of spaced-apart parallel bars is oriented in the horizontal direction, and the plant openings are each bounded by adjacent horizontal and vertical or diagonal bars.

11 Claims, 10 Drawing Sheets

(56) References Cited

U.S. PATENT DOCUMENTS

| | | | | |
|---|---|---|---|---|
| 2009/0223126 A1* | 9/2009 | Garner | ............ | E04F 13/083 47/65.5 |
| 2011/0146147 A1* | 6/2011 | Irwin | ............ | A01G 9/025 47/66.7 |
| 2014/0096446 A1* | 4/2014 | Daniels | ............ | A01G 9/025 47/82 |
| 2018/0295790 A1* | 10/2018 | Bernardes | ............ | E04H 17/20 |
| 2023/0354754 A1* | 11/2023 | Spiro | ............ | A01G 9/025 |

FOREIGN PATENT DOCUMENTS

| | | |
|---|---|---|
| DE | 6932431 | 3/1970 |
| DE | 19531647 | 3/1996 |
| EP | 2532786 A1 | 12/2012 |
| EP | 3228185 | 10/2017 |
| EP | 3786362 | 3/2021 |
| WO | 2005005747 | 1/2005 |
| WO | 2016142283 | 9/2016 |

\* cited by examiner

GREENABLE WALL ELEMENT

CROSS-REFERENCE TO RELATED APPLICATIONS

This application is a 371 National Phase of PCT/EP2021/071758, filed Aug. 21, 2021, which claims priority from German Patent Application No. 10 2020 121 022.1, filed on Aug. 10, 2020, both of which are incorporated herein by reference as if fully set forth.

TECHNICAL FIELD

The invention relates to a greenable which has at least one wall component oriented in particular in a vertical or, deviating therefrom, a diagonal direction, which delimits a cavity, fillable with planting substrate, of the wall element, and which has a multiplicity of planting openings through which planting openings plants that are rooted in the planting substrate can grow onto the side of the wall element facing away from the planting substrate.

BACKGROUND

A greenable wall element of the type mentioned at the beginning is already previously known from WO 2016/142283 A1. The previously known wall element has a vertical front wall and a likewise vertical rear wall, which are retained by their lateral edges on both sides on vertical posts such that a cavity that is open at the bottom and top is defined, in which cavity a planting substrate is provided. The vertical front wall of the previously known wall element has a metal sheet which has a multiplicity of pocket-like and upwardly open protrusions, which protrude on the flat side from the sheet-metal front wall. The protrusions arranged in horizontal rows are shifted by half a period such that the pocket-like protrusions are accessible from above and each row of protrusions is formed in the manner of a wave that is triangular or square in horizontal cross section.

Since planting is not possible in the wave troughs of protrusions respectively forming a row and since plants that are rooted in the planting substrate can grow through in the protrusions, the previously known wall element can give the impression of patchy growth. Since the rows of protrusions arranged one above another each form a wave, since the protrusions provided in the rows arranged one above another are arranged in a manner offset from one another by half a period, and since the rows are in contact with one another only in a small subregion of the narrow-side edges, the stability of the metal sheet forming the front wall is limited and calculable only with difficulty.

SUMMARY

The objective addressed is therefore to create a greenable wall element of the type mentioned at the beginning, which is characterized by comparatively low production complexity while at the same time having high stability.

This objective is met according to the invention in that the at least one wall component of the wall element has, at least in a subregion, a slatted grating which is formed from mutually crossing groups of bars of which a first group of spaced-apart parallel bars is oriented in a vertical or diagonal direction and of which a second group of spaced-apart parallel bars is oriented in a horizontal direction, and in that the planting openings are each bounded by adjacent horizontal and vertical or diagonal bars.

In the context of the claimed invention, "oriented in a diagonal direction" can be understood as meaning "oriented obliquely with respect to a planar standing surface of the wall element" and/or "oriented in a direction deviating from a vertical direction".

The greenable wall element according to the invention has at least one wall component oriented approximately in a vertical or diagonal direction, which delimits a cavity, fillable with earth, and or similar planting material, of the wall element. The at least one wall component has a multiplicity of planting openings through which planting openings the plants that are rooted in the planting substrate and are provided to green the wall element according to the invention can grow onto the side of the wall element facing away from the planting substrate. Here, the at least one wall component of the wall element according to the invention has at least one slatted grating which is formed from mutually crossing groups of bars of which a first group of spaced-apart parallel bars is oriented in a vertical or diagonal direction and of which a second group of spaced-apart parallel bars is oriented approximately in a horizontal direction. Here, the planting openings passed through by the plants are bounded by adjacent horizontal and vertical or diagonal bars. Since the planting holes or openings that adjoin one another in rows are separated from one another only by a narrow bar, the wall element according to the invention allows uniformly thick growth. Since the at least one wall component of the wall element according to the invention is reinforced by a group of vertical or diagonal supporting bars, the wall element according to the invention can be produced with great strength and a high load-bearing capacity, able, if required, to be determined in advance.

In order that the slatted grating forming the wall component can retain the planting substrate in the cavity of the wall element according to the invention, and in order that the planting substrate does not trickle out of the planting openings in the slatted grating, it is advantageous when the bars oriented in the horizontal direction are angled obliquely upward toward the outer side of the wall element.

In order that the slatted grating has the bounded planting openings right into its outer peripheral edge zone, it is advantageous when the slatted grating provided at least in a subregion of the at least one wall component is surrounded at its outer periphery by a frame.

The planting substrate is retained particularly well in the cavity of the wall element according to the invention when the external longitudinal edge of the bars oriented in the horizontal direction protrudes beyond the bars oriented in the vertical or diagonal direction.

An embodiment of the slatted grating provided as the wall component which is simple in terms of construction and production provides that the slatted grating(s) is/are in the form of a pressed grating, that the bars oriented in the vertical or diagonal direction serve as supporting bars, and that the bars in the form of filling bars and oriented in the horizontal direction have been inserted into indentations in the supporting bars.

The at least one slatted grating of the wall element according to the invention can be produced from any sufficiently stable and resistant material. Therefore, it is advantageous when the slatted grating(s) is/are produced from a metallic or non-metallic material. Here, it may be advantageous when the slatted grating(s) is/are produced from plastic and in particular from a glass-fiber-reinforced plastic. Such a slatted grating produced from plastic can also be produced integrally with its mutually crossing bars.

In order to use the wall element according to the invention advantageously for wall greening, the slatted grating(s) forming a wall component may be held on a wall and at a distance from the latter. In this embodiment, the slatted grating forming the wall element according to the invention is held on a wall and at a distance from the latter such that a cavity that is fillable with planting substrate is formed between the slatted grating and the wall.

Here, a preferred development of the invention provides that an insulating layer that is preferably moisture-impermeable over its entire area and/or is thermally insulating is provided between the planting substrate located in the cavity of the wall element on one side and the wall on the other side. The insulating layer protects the wall carrying the wall element against the moisture contained in the planting substrate. In addition or alternatively, the insulating layer may prevent input of cold or heat into the planting substrate, which could otherwise impair the roots, located in the planting substrate, of the plants used for greening.

A further solution to the problem stated above, for which protection is claimed independently, and which is able to be realized in addition or alternatively to the above-described features, provides that the wall element has at least two spaced-apart stand elements in the form of precast concrete parts which have at least one slot in their narrow sides that face one another and are oriented in the vertical or diagonal direction, in which slot at least one wall component is held.

The wall element configured in such a way has at least two spaced-apart stand elements which have been produced as precast concrete parts. These stand elements have at least one slot in their narrow sides that face one another and are oriented in the vertical or diagonal direction, in which slot at least one wall component is held. This wall component delimits a cavity, fillable with planting substrate, of the greenable wall element and has a multiplicity of planting openings through which the plants that are rooted in the planting substrate can grow onto the side of the wall element facing away from the planting substrate.

Here, the at least one wall component having the planting openings may be produced for example from at least one water-resistant thermal insulation panel provided with holes. However, preference is given to an embodiment in which the at least one wall component has, at least in a subregion, a slatted grating which is formed from mutually crossing groups of bars of which a first group of spaced-apart parallel bars is oriented in a vertical or diagonal direction and of which a second group of spaced-apart parallel bars is oriented in a horizontal direction, wherein the planting openings are each bounded by adjacent horizontal and vertical or diagonal bars.

As a result of its stand elements prefabricated at the factory as precast concrete parts, the wall element according to the invention is characterized by easy production and a high load-bearing capacity.

It is advantageous when the at least one slot is in the form of a guide slot into which guide slot the at least one wall component is insertable.

In order, using the wall elements according to the invention, to also create a greened wall, for example a noise protection wall, it is particularly advantageous when the precast concrete parts of the wall element are in the form in particular of L-shaped wall panels.

In one embodiment of the wall element, it is provided that said wall element comprises at least two spaced-apart wall components that delimit and/or define a cavity between one another. The cavity that is delimited and/or defined by the at least two wall components of the wall element can be used to receive a planting substrate. Such a wall element may have the at least two wall components on sides of the wall element that face away from one another or adjoin one another. Thus, it is possible to green the wall element on two different visible sides.

The wall element can thus have in each case at least one wall component on at least two different sides, in particular on a front side and on a rear side of the wall element.

In one embodiment of the wall element, it is provided that the at least two wall components are oriented parallel to one another. In this way, a wall element having for example at least two wall components that are oriented vertically or parallel, but diagonally may be provided on two different sides of the wall element. At this point, it should be noted that it is quite conceivable to equip two mutually adjoining sides of the wall element with in each case at least one wall component of the type described above. In this way, it is possible to provide a wall element that is greenable around a corner.

In one embodiment of a wall element which comprises two wall components that delimit and/or define a cavity between one another, it is provided that at least one of the at least two wall components is oriented diagonally, in particular diagonally with respect to a standing surface of the wall element, on the wall element. Here, the at least two wall components may together define an acute angle. This is the case even when the two wall components are each separately oriented diagonally with respect to a standing surface of the wall element.

In one embodiment of the wall element, it is provided that the at least two wall components are connected together by connecting elements.

As connecting elements, it is possible to use for example connecting profiles. Such a wall element may form a self-supporting structure and be set up even when there is no separate supporting structure such as a supporting wall. Here too, it should again be noted that, in one embodiment of the wall element, both of the at least two wall components are oriented vertically and at the same time parallel to one another. In another embodiment of the wall element, at least one of the at least two wall components is oriented vertically, while at least one other of the at least two wall components is oriented differently, obliquely with respect to a vertical direction and thus diagonally, such that the two wall components define an acute angle between one another.

In a further embodiment of the wall element, the at least two wall components are oriented diagonally with respect to a vertical and at the same time also diagonally with respect to a standing surface of the wall element such that they together define an acute angle between one another.

The production of the wall element according to the invention and the handling thereof is further simplified when the wall panels of the wall element carry at least one metal profile on their mutually facing narrow sides, which metal profile has the at least one slot.

BRIEF DESCRIPTION OF THE DRAWINGS

Developments according to the invention will become apparent from the following description in conjunction with the claims and the drawing. The invention is described in more detail below with reference to preferred exemplary embodiments.

Specifically.

DETAILED DESCRIPTION

Figure 1:
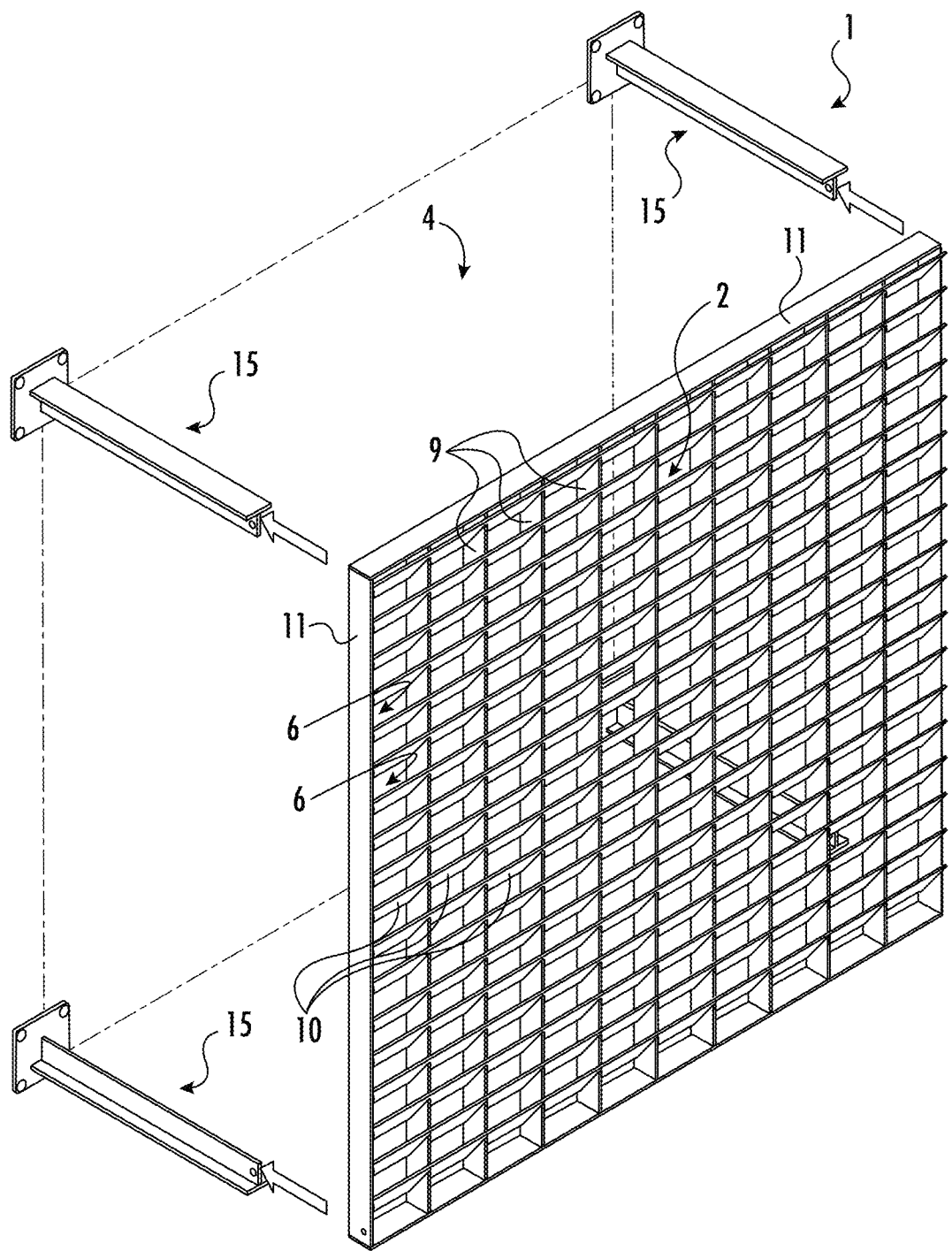
FIG. 1 shows a greenable wall element which has, on the flat side, a wall component in the form of a slatted grating, which wall component can be fastened to a building wall or a wall and at a distance therefrom with the aid of supporting elements such that the cavity formed between the wall component and the wall is fillable with planting substrate.
Figure 2:
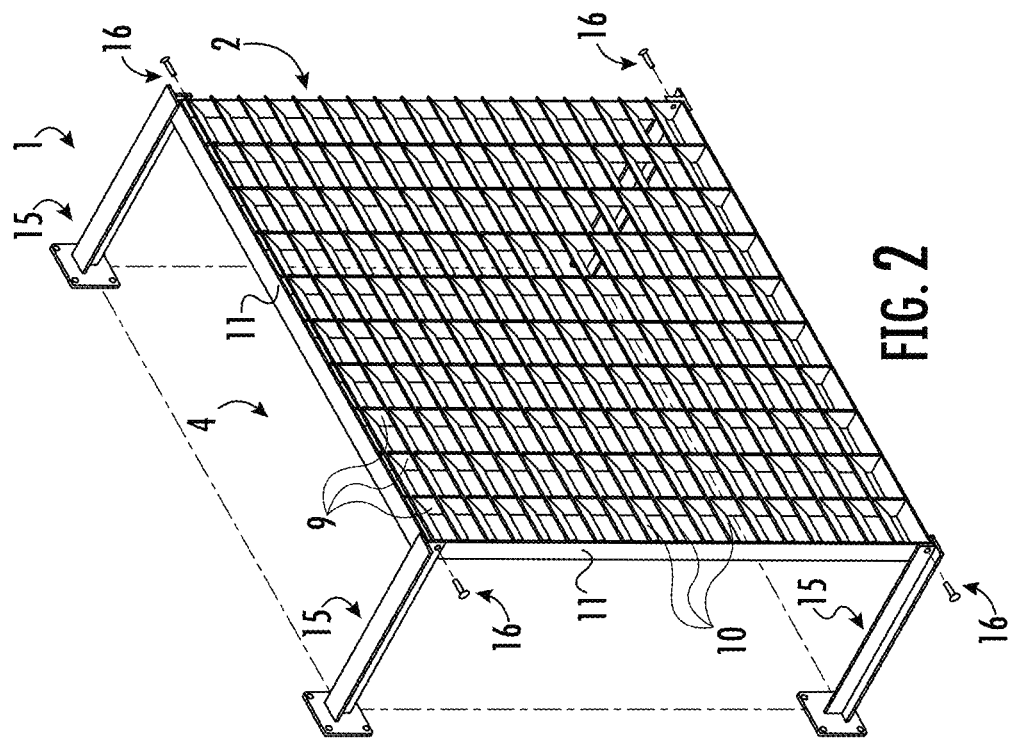
FIG. 2 shows the wall element from FIG. 1 in a mounted state.

In the following description of the figures and in the figures, functional elements that have a comparable or the same function are provided with the same reference signs.

FIGS. 1 to 9 and 10 to 12 illustrate different embodiments 1, 5, 7 and 8 of a wall element that serves for vertical greening. The wall elements 1, 5, 7 and 8 illustrated here have at least one wall component 2 that is oriented in a vertical or in a diagonal direction and delimits a cavity 4, fillable with planting substrate 3, of the wall element 1, 5, 7, 8. The at least one wall component 2 has a multiplicity of planting openings 6 through which planting openings 6 the plants that are rooted in the planting substrate 3 can grow onto the side of the wall element 1, 5, 7, 8 facing away from the planting substrate 3.

The at least one wall component 2 of the wall elements 1, 5, 7, 8 has a slatted grating that serves as a wall component and is formed from groups of mutually crossing bars 9, 10 of which a first group or spaced-apart parallel bars 9 is oriented in a vertical direction and of which a second group of spaced-apart parallel bars 10 is oriented in a horizontal direction. Here, the planting openings 6 are each bounded by adjacent horizontal and vertical bars 9, 10.

Figure 4:
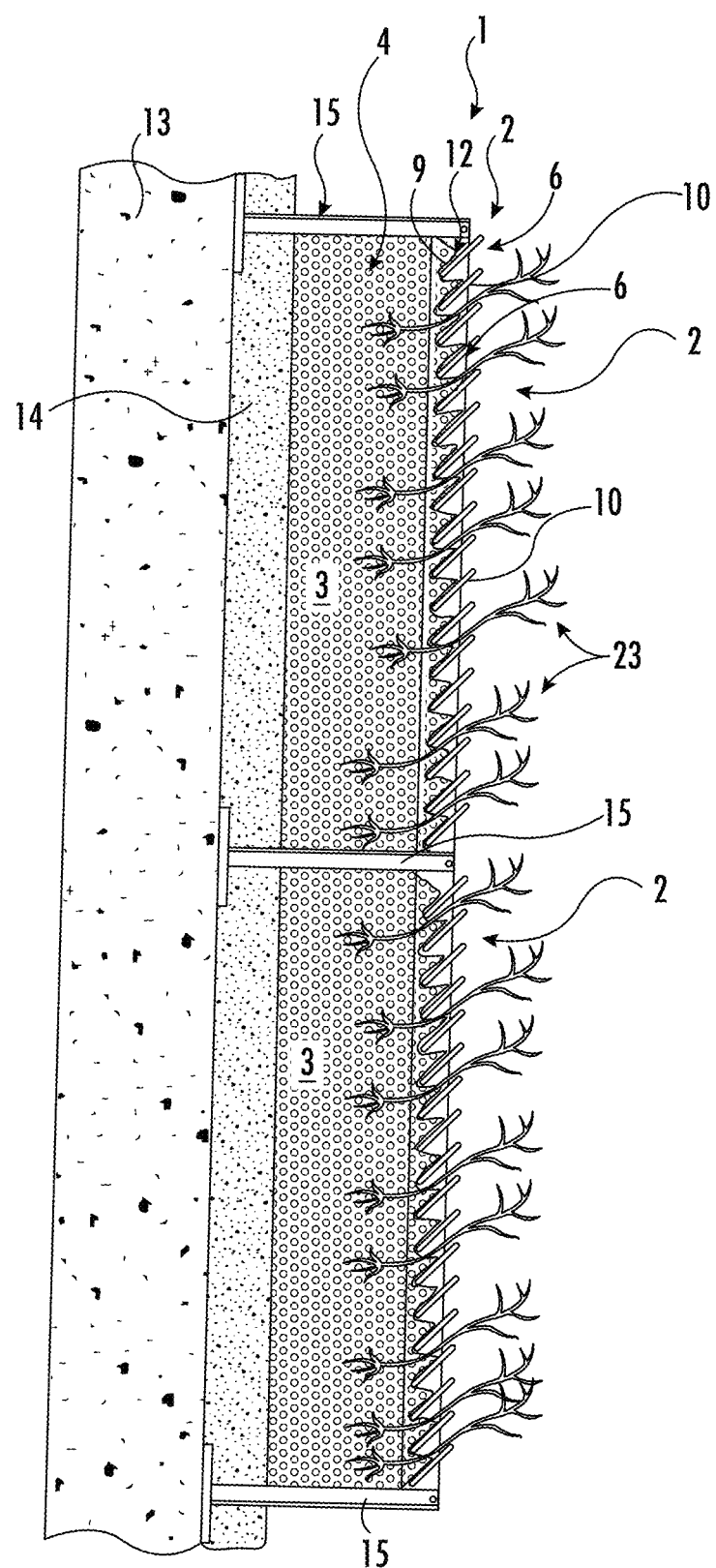
FIG. 4 shows a longitudinal section through the greenable wall element from FIGS. 1 to 3 fastened to a precast concrete part forming the façade of a building or to a similar building wall.

It is apparent from the longitudinal section in FIG. 4 that the bars 10 oriented in the horizontal direction are angled obliquely upward toward the outer side of the wall element 1, 5, 7, 8 and that the external longitudinal edge of the bars 10 oriented in the horizontal direction protrudes beyond the bars 9 oriented in the vertical direction. This is also the case for the wall elements 1 shown in FIGS. 10 to 12.

It is clear from FIGS. 1, 2, 5, and 8 and 9, and 10 to 12 that the slatted grating provided at least in a subregion of the at least one wall component 2 is surrounded at its outer periphery by a frame 11.

The slatted gratings used as in each case one wall component 2 may be produced from a non-metallic material and, for example, from plastic. By contrast, the wall components of the wall elements 1, 5, 7 and 8, and 10 to 12 are produced from a metallic material. Here, the slatted gratings are each in the form of pressed gratings, in which the bars 9 oriented in the vertical or diagonal direction serve as supporting bars and in which the bars 10 in the form of filling bars and oriented in the horizontal direction have been inserted into indentations 12 in the supporting bars 9. In the case of the wall element 1 illustrated in FIGS. 1 to 4, the at least one slatted grating serving as a wall component 2 is held on a wall 13 and at a distance therefrom. The cavity 4 provided between the wall 13 and the wall component 2 in the form of a slatted grating is fillable with a planting substrate 3. It is apparent from FIG. 4 that an insulating layer 14 that extends over the entire area can be provided between the planting substrate 3 located in the cavity 4 of the wall element 1 on one side and the wall 13 on the other side. This insulating layer 14 may be moisture-impermeable in order to protect the wall 13 against the moisture present in the planting substrate 3 and against the roots of the plants in the wall element 1. In addition or alternatively, the insulating layer 14 may also have a thermally insulating function which protects the roots, located in the planting substrate 3, of the plants from input of heat or cold from the wall 13.

In order for it to be possible to fasten the slatted grating serving as a wall component 2 to the wall 13, supporting elements 15 are provided in the corner regions of the preferably rectangular and in particular square wall component 2. These supporting elements each have a wall-side fastening flange, from which a bar that serves as a spacer protrudes in a horizontal direction. At the free bar end of the supporting elements 15, the wall component 2 in the form of a slatted grating is able to be inserted with an exact fit and is able to be fixed by way of bolts, expandable split pins, screws 16 or similar fastening means.

Figure 3:
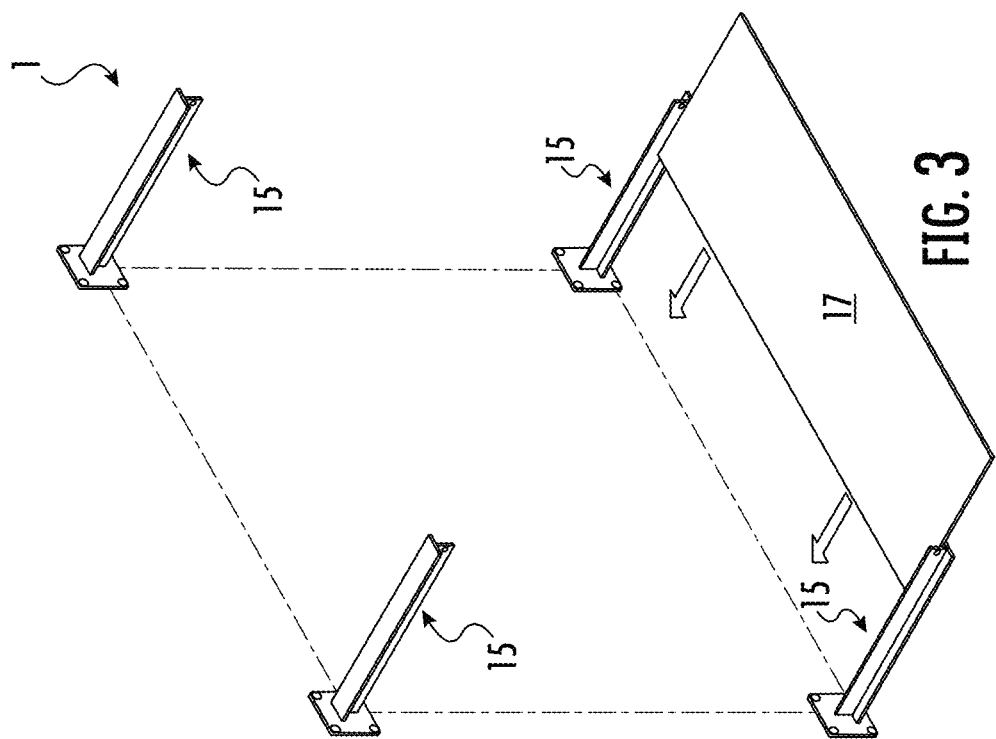
FIG. 3 shows the supporting elements, used for the mounting of the wall element shown in FIGS. 1 and 2, before the insertion of a base plate.

It is apparent from FIG. 3 that the cavity delimited by the wall component 2 can be closed laterally, at the top or—as here—at the bottom by separating plates 17. It goes without saying that a plurality of such wall elements 1 formed from the supporting elements 15 and a wall component 2 can be arranged alongside and above one another on a wall. As a result of the insertion of corresponding separating plates 17, the cavities of these wall elements 1 can also be separated from one another. While planting substrate can be introduced into one wall element 1 in order for plants to be able to grow through the planting openings 6 in the wall component 2, it is also possible for stones to be filled into the cavity 4 of an adjacent wall element 1, which form a wall structure in which lizards or other animals can find refuge. It is also possible to introduce tubular, preferably vegetable material into the cavity 4 of such a wall element 1 such that the openings, oriented in the horizontal direction, of this tubular material can serve as a possible nesting site for insects.

Figure 5:
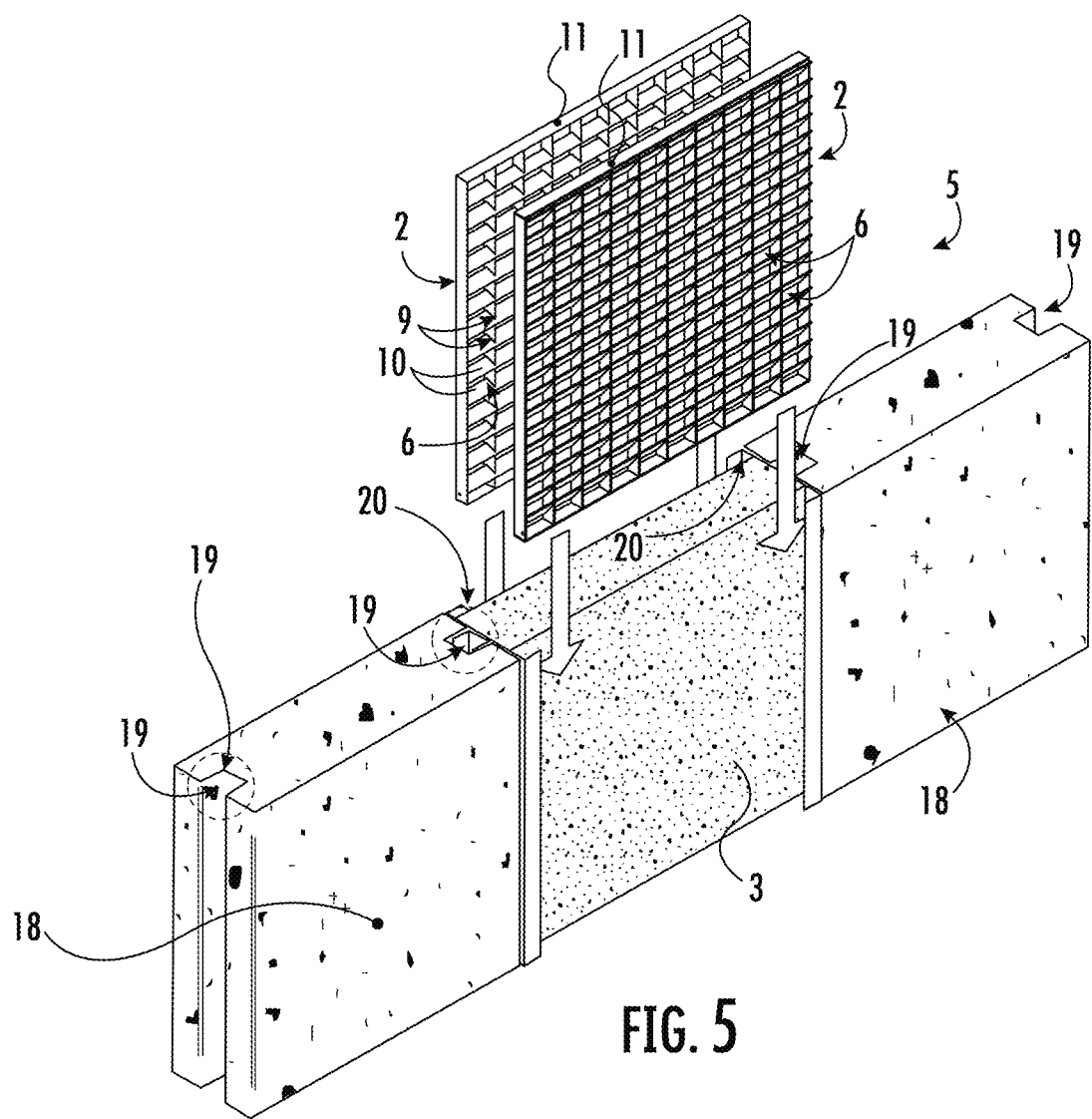
FIG. 5 shows a greenable wall element which has two stand elements prefabricated as precast concrete parts, between which two wall components are provided which are each formed from a slatted grating and which delimit a cavity filled with planting substrate between one another, wherein the stand elements each have a guide slot on their mutually facing narrow sides, into which guide slots the wall components can be inserted.
Figure 6:
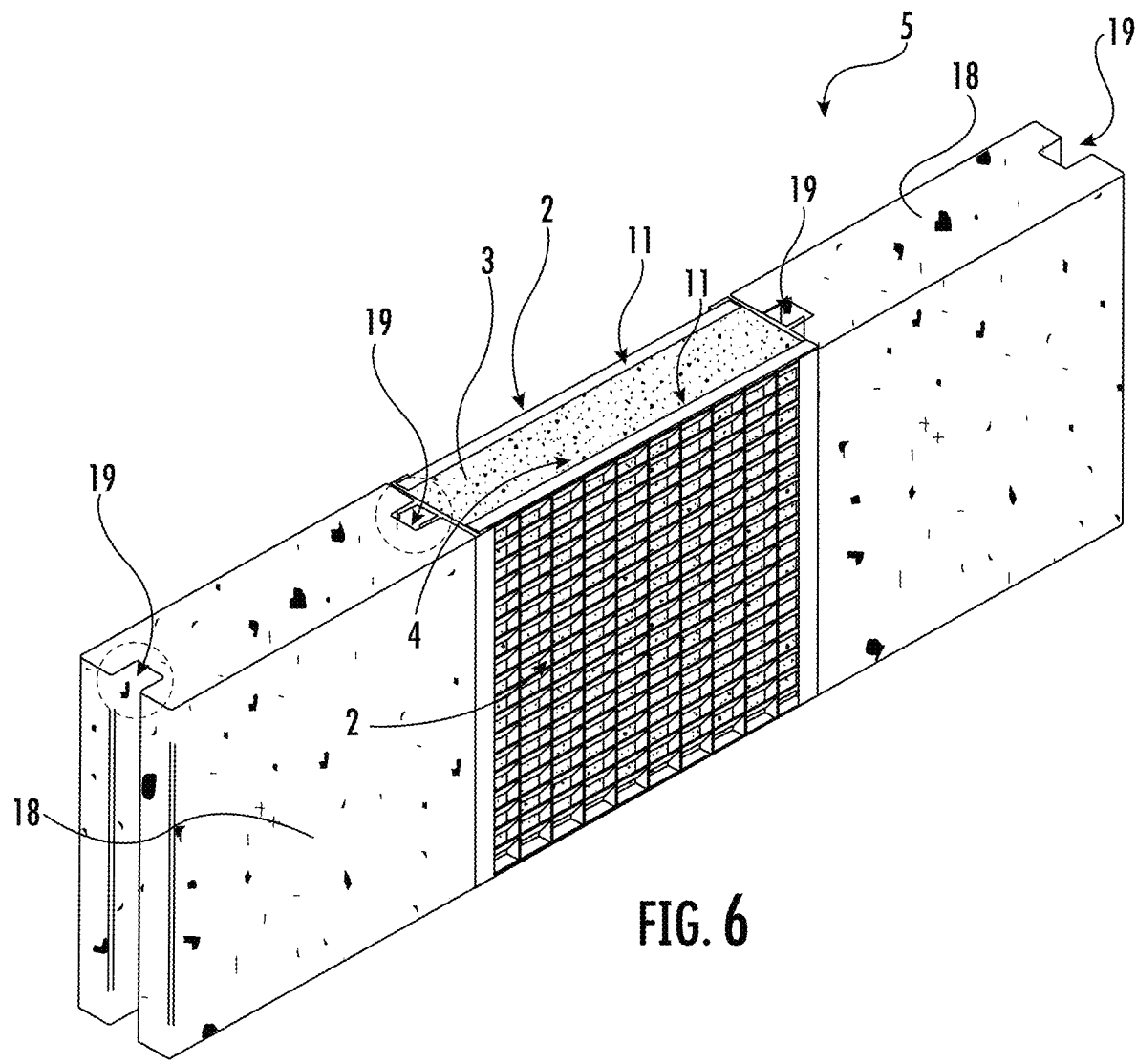
FIG. 6 shows the greenable wall element from FIG. 5 in a mounted state.
Figure 7:
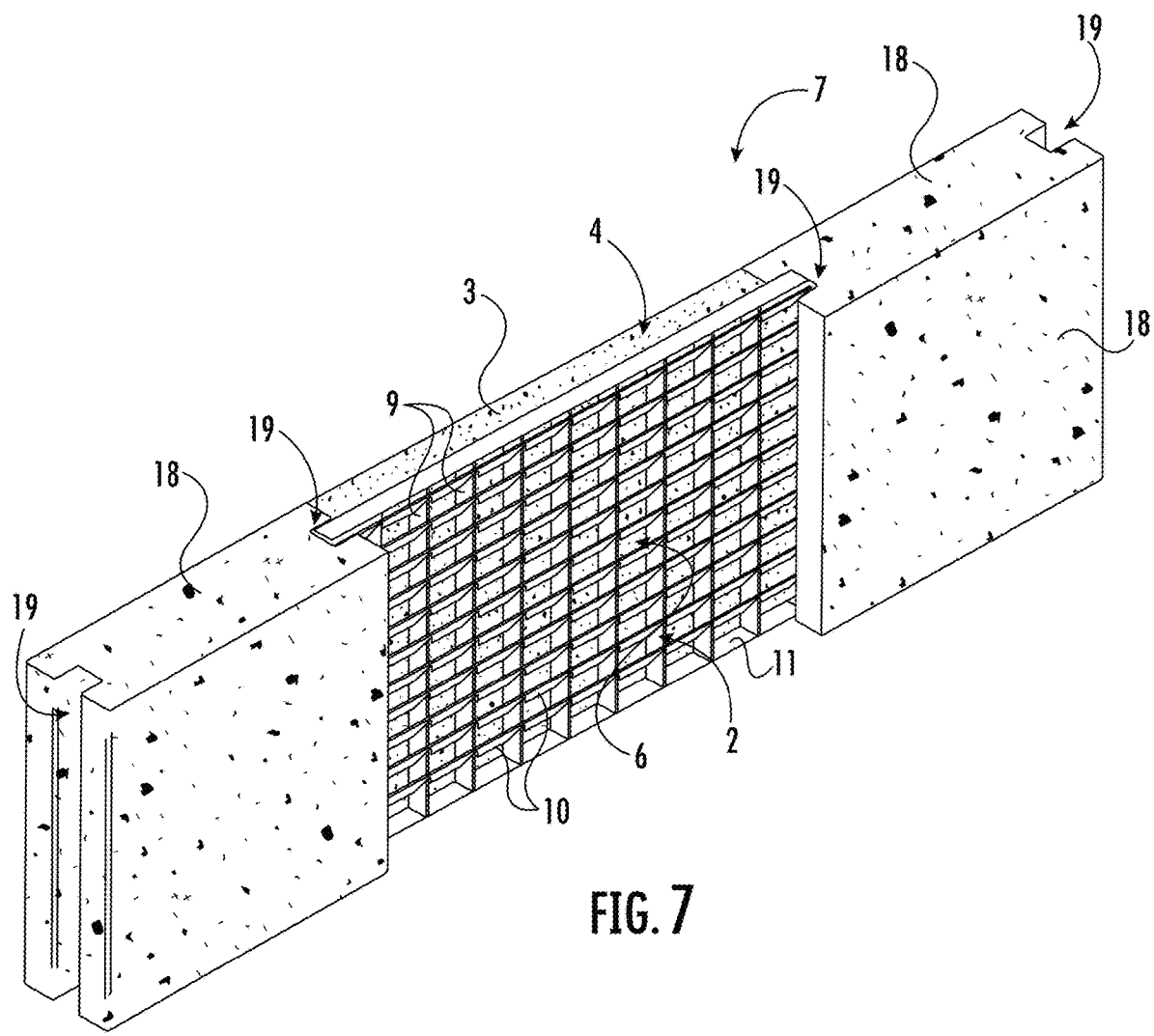
FIG. 7 shows a wall element configured in a comparable manner to FIGS. 5 and 6, but in which only one wall component, which retains the planting substrate filled at the rear, has been inserted into the narrow-side slots in the stand elements produced as precast concrete parts.

The wall elements 5, 7 shown in FIGS. 5 to 7 have at least two spaced-apart stand elements 18 in the form of precast concrete parts which 18 have at least one slot 19, 20 in their narrow sides that face one another and are oriented in the vertical direction, in which slot 19, 20 at least one wall component 2 is held.

The slots 19, 20 of the wall elements 5, 7 are in the form of guide slots here, into which guide slots 19, 20 the at least one wall component 2 can be inserted preferably from above.

It is clear from a comparison of FIGS. 5 and 6, for the one part, and FIG. 7, for the other part, that the stand elements 18 of the wall elements 5, 7 are configured identically. A guide slot 19 is formed in each case into the narrow side of the stand elements 18 in the form of cast concrete parts. This guide slot 19 in the stand elements 18 is dimensioned such that a wall component 2 is insertable into this slot 19. If two spaced-apart wall components 2 that delimit a cavity 4 between one another are intended to be held at the vertical narrow edges of the positioning elements 18, a metal profile is able to be inserted into the slot 19 of the precast concrete parts that serves as stand elements 18, said metal profile subsequently forming an enlarged guide slot 20 into which it is also possible to insert two spaced-apart wall components 2.

Figure 8:
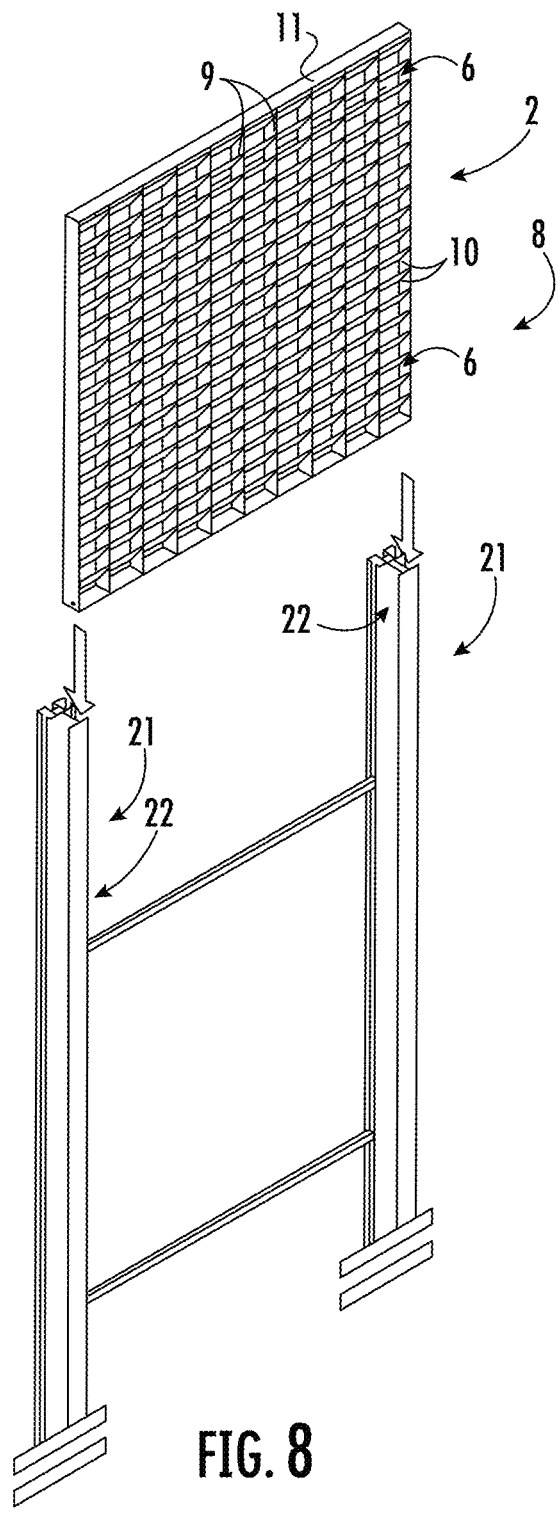
FIG. 8 shows a greenable wall element which has two vertical profile bars as stand elements, which each have a guide slot on their mutually facing sides, immediately before the insertion of at least one wall component in the form of a slatted grating into the guide slots in these stand elements.
Figure 9:
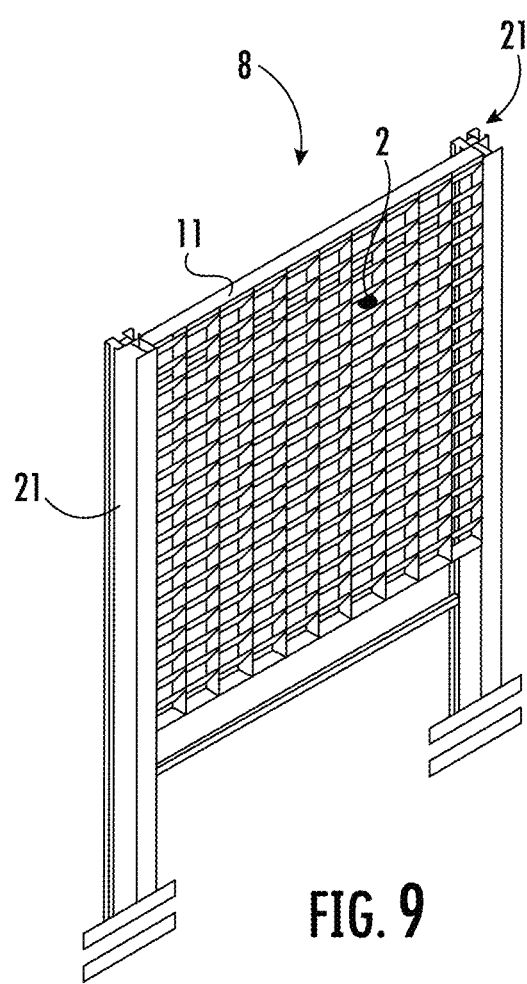
FIG. 9 shows the wall element from FIG. 8 in a mounted state.

In the case of the wall element 8 shown in FIGS. 8 and 9, two vertical profile bars 21 are provided, which serve as stand elements and each have a guide slot 22 on their mutually facing sides. At least one wall component 2 in the form of a slatted grating is insertable into this guide slot 22 of the profile bars 21. The wall component 2, in the form of a slatted grating, of the wall element 8 also delimits a cavity (not shown in more detail here) which is fillable with a planting substrate.

Figure 10:
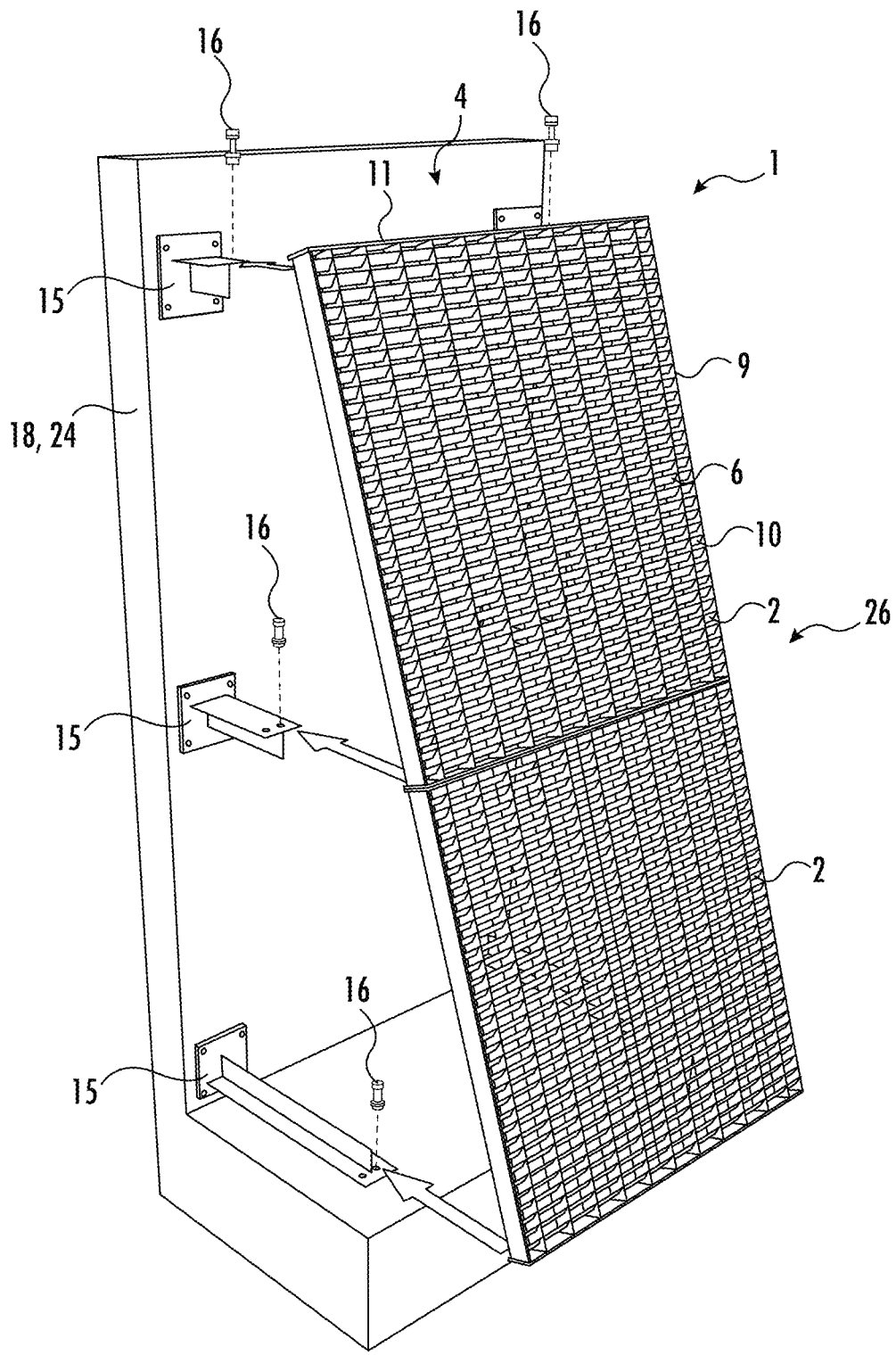
FIG. 10 shows a greenable wall element which is similar to the wall element shown in FIG. 1 in terms of structure, but has wall components fastened in a diagonal orientation to an L-shaped concrete part.

FIG. 10 shows a greenable wall element 1 which has wall components 2 of the type described above, which are oriented obliquely, i.e. in a diagonal direction deviating from a vertical direction, on a visible side of the wall element 1. The wall components 2 of the wall element 1 shown in FIG. 10 are connected via supporting elements 15 to a stand element 18 of the wall element 1.

A cavity 4 is formed between the supporting element 18 and the wall components 2 in this wall element 1, too, and this cavity, as for example in FIG. 4 in the case of a wall element 1 having vertically oriented wall components 2, can be filled with a planting substrate.

The wall element 1 shown in FIG. 10 comprises, as a stand element 18 for fastening the wall component 2, an L-shaped concrete element 24 which in this case adopts the function of a wall and serves as a support for the wall components 2.

Figure 11:
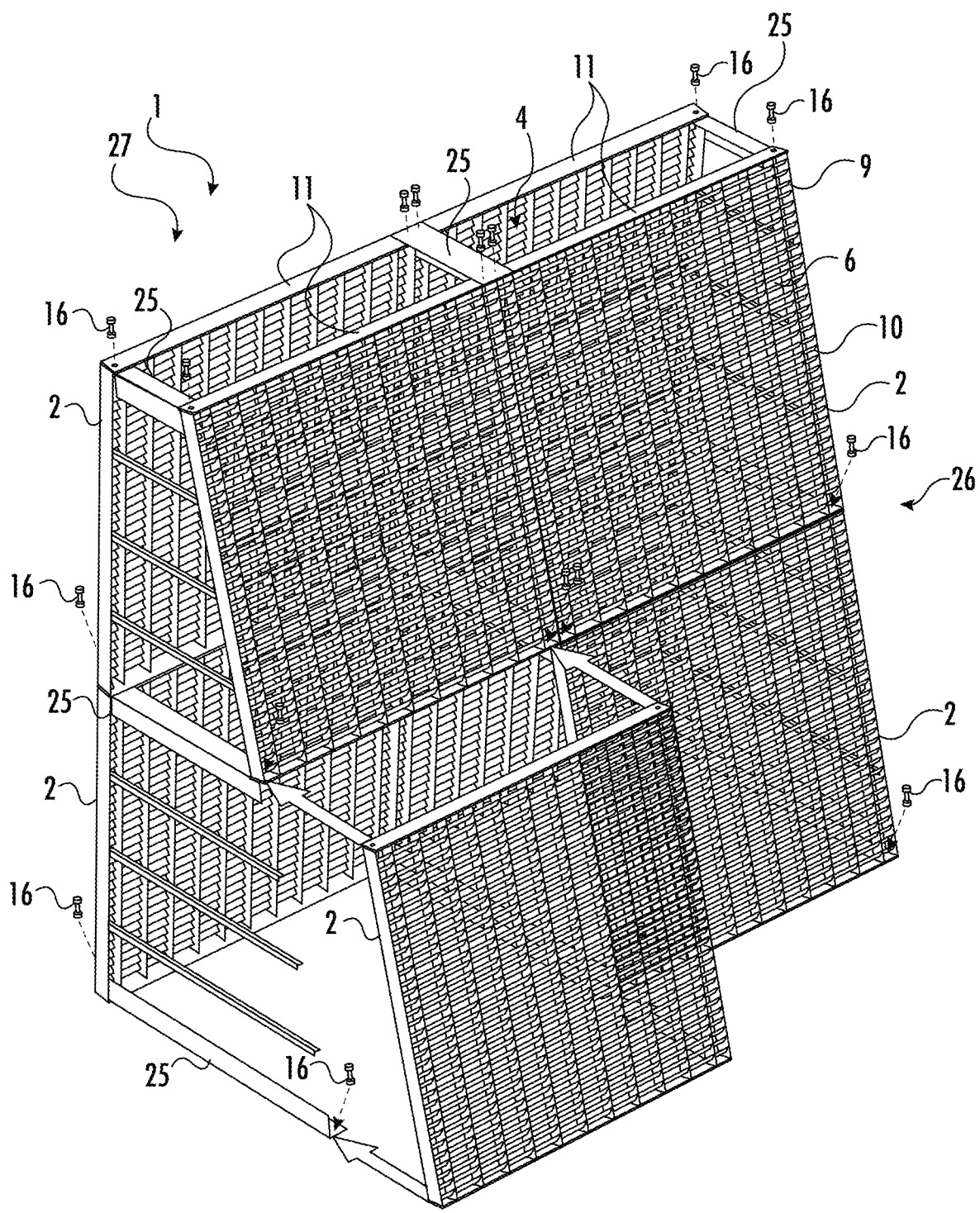
FIG. 11 shows a greenable wall element having two a plurality of wall components that are connected together and delimit a cavity for receiving a planting substrate between one another, wherein the wall components on one side of the wall element are oriented vertically and the wall components on another side of the wall element are oriented diagonally such that the wall components on the different sides of the wall element define an acute angle between one another.

FIG. 11 shows a wall element 1 with diagonally oriented wall components 2 on a front side 26 and vertically oriented wall components 2 on a rear side 27 facing away from the front side 26.

The wall element 1 shown in FIG. 11 can be used for example as a noise protection wall. The wall components 2 on the front side 26 of the wall element 1 are arranged in a manner spaced apart from the wall components 2 on the rear side 27 of the wall element 1 such that the wall components 2 on the front side 26 delimit, with the wall components 2 on the rear side 27, a cavity 4 which can be used in turn to receive a planting substrate 3.

The wall components 2 arranged on the front side 26 are connected by connecting elements 25, in this case by connecting profiles, to the wall components 2 on the rear side 27 of the wall element 1.

Each of the wall components 2 of the wall element 1 shown in FIG. 11 has a rectangular, square cross section. A wall element 1 of virtually any desired size can be configured from a plurality of such wall components 2.

Figure 12:
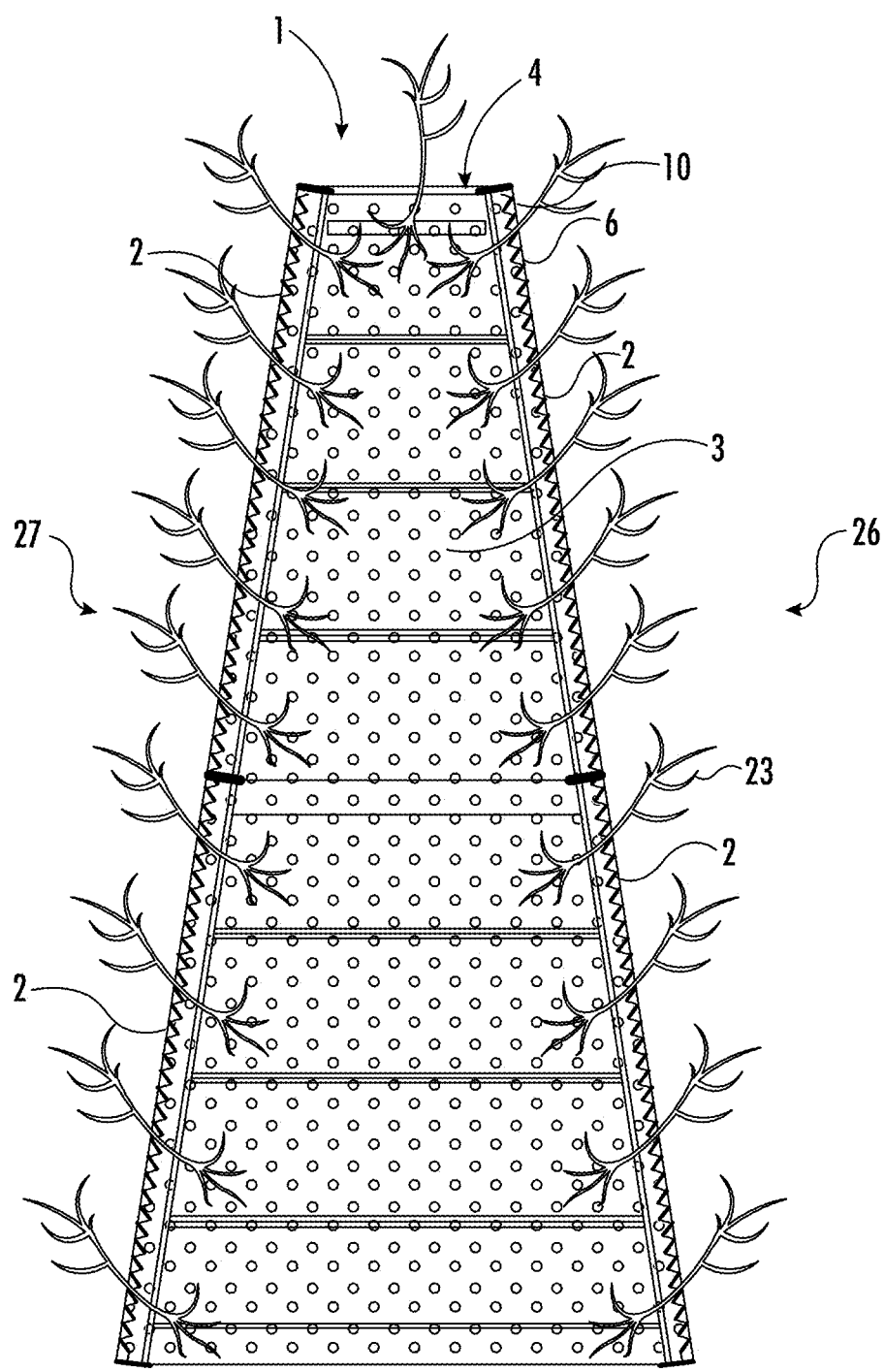
FIG. 12 shows a greenable wall element having a plurality of wall components that are connected together and delimit a cavity for receiving a planting substrate between one another, wherein the wall components on one side of the wall element and the wall components on another side of the wall element define an acute angle between one another and are oriented diagonally with respect to a standing surface of the wall element and to a vertical direction.

FIG. 12 shows a further embodiment of a wall element 1 which can be greened both on its front side 26 and on its rear side 27. For this purpose, the wall element 1 according to FIG. 12 has, both on its front side 26 and on its rear side 27, wall components 2 which are connected together by connecting elements 25. Here, the wall components 2 on the front side 26 and the wall components 2 on the rear side 27 of the wall element 1 are oriented diagonally with respect to a standing surface of the wall element 1 such that they together define an acute angle. Formed in turn between the wall components 2 on the front side 26 and those on the rear side 27 of the wall element 1 is a cavity 4 into which a planting substrate 3 can be filled, as is also shown in the illustration according to FIG. 12.

The wall elements 1 shown in FIGS. 11 and 12 form, by way of their wall components 2 connected together via connecting elements 25, a self-supporting structure which does not require any other supporting structure such as a wall 13 or a concrete element 24 to which the wall components 2 would need to be fastened.

The wall elements 1 shown in FIGS. 10 to 12 each comprise a plurality of wall components 2 which are each formed from a slatted grating. The slatted grating of the diagonally oriented wall components 2 is formed from groups of mutually crossing bars 9, 10 of which a first group of spaced-apart parallel bars 9 is oriented in a diagonal direction in the use position of the respective wall component 2 and of which a second group of spaced-apart parallel bars 10 is oriented in a horizontal direction. Here, the planting openings 6 are each bounded by adjacent horizontal and diagonal bars 9, 10.

LIST OF REFERENCE SIGNS

1 Wall elements according to FIGS. 1 to 4 and 10 to 12
2 Wall component
3 Planting substrate
4 Cavity
5 Wall element according to FIG. 5
6 Planting openings
7 Wall element according to FIG. 7
8 Wall element according to FIGS. 8 and 9
9 (Supporting) bar oriented in a vertical or diagonal direction
10 (Filling) bar oriented in a horizontal direction
11 Frame
12 Indentations
13 Wall
14 Insulating layer
15 Supporting elements of the wall elements 1 according to FIGS. 1 to 4 and 10

16 Screws on the wall elements 1 according to FIGS. 1 to 4 and 10 to 12
17 Separating plate
18 Stand elements of the wall elements 1, 5, 7 according to FIGS. 5 to 7 and 10
19 Slot in the stand elements 18
20 Slot
21 Profile bars
22 Guide slot in the profile bars 21
23 Plants
24 Concrete element
25 Connecting element
26 Front side of 1
27 Rear side of 1

The invention claimed is:

1. A greenable wall element, comprising:
at least one wall component (2) oriented in a vertical or a diagonal direction that delimits a cavity (4), between the at least one wall component (2) and a wall, that is filled with planting substrate (3), and the at least one wall component (2) has a multiplicity of planting openings (6) through which planting openings (6) plants (23) that are adapted to be rooted in the planting substrate (4) can grow onto a side of the wall element facing away from the planting substrate;
the at least one wall component (2) has, at least in a subregion, a slatted grating formed from mutually crossing groups of bars (9, 10) of which a first group of spaced-apart parallel ones of the bars (9) is oriented in a vertical or diagonal direction and a second group of spaced-apart parallel ones of the bars (10) is oriented in a horizontal direction;
the planting openings (6) are each bounded by adjacent horizontal and vertical or diagonal ones of the bars (9, 10), and the bars (10) oriented in the horizontal direction are angled obliquely upward toward an outer side of the wall element;
wherein the slatted grating comprises a pressed grating, the bars (9) oriented in the vertical direction comprise supporting bars, and the bars (10) oriented in the horizontal direction comprise filling bars inserted into indentations (12) in the supporting bars (9); and
the slatted grating is comprised of at least one of a metallic material, a non-metallic material, plastic or glass fiber reinforced plastic.

2. The wall element as claimed in claim 1, further comprising a frame (11) surrounding the slatted grating provided at least in a subregion of the at least one wall component (2) at an outer periphery thereof.

3. The wall element as claimed in claim 1, wherein an external longitudinal edge of the bars (10) oriented in the horizontal direction protrudes beyond the bars (9) oriented in the vertical direction.

4. The wall element as claimed in claim 1, wherein the slatted grating is configured to be held on a wall (13) and at a distance therefrom.

5. The wall element as claimed in claim 4, further comprising an insulating layer (14) that is at least one of moisture-impermeable over an entire area thereof or is thermally insulating located between the planting substrate (3) located in the cavity (4) of the wall element (1) on one side and a wall (13) on an other side.

6. The greenable wall element according to claim 1, further comprising at least two spaced-apart stand elements (18) formed as precast concrete parts which (18) have at least one slot (19, 20) in narrow sides thereof that face one another and are oriented in the vertical direction, and the at least one wall component (2) is held in said at least one slot (19, 20).

7. The wall element as claimed in claim 6, the at least one slot (19, 20) comprises a guide slot, and the at least one wall component (2) is insertable into said guide slot (19, 20).

8. The wall element as claimed in claim 1, further comprising a stand element formed as precast concrete part, and the precast concrete part is L-shaped.

9. The wall element as claimed in claim 1, wherein the at least one wall component comprises two spaced-apart wall components (2) that at least one of delimit or define a cavity (4) between one another, and a) the at least two wall components (2) are oriented parallel to one another, or b) at least one of the two wall components (2) is oriented diagonally or the two wall components (2) together define an acute angle.

10. The wall element as claimed in claim 1, wherein the at least one wall component (2) comprises at least two of the wall components, (2) with a respective one being located on each of at least two different sides of the wall element.

11. The wall element as claimed in claim 10, wherein the at least two wall components (2) are connected together by connecting elements (25) and, form a self-supporting structure.

* * * * *